P. L. FOWLER.
JAR HOLDER AND TOP REMOVER.
APPLICATION FILED JULY 28, 1915.
1,211,695.
Patented Jan. 9, 1917.
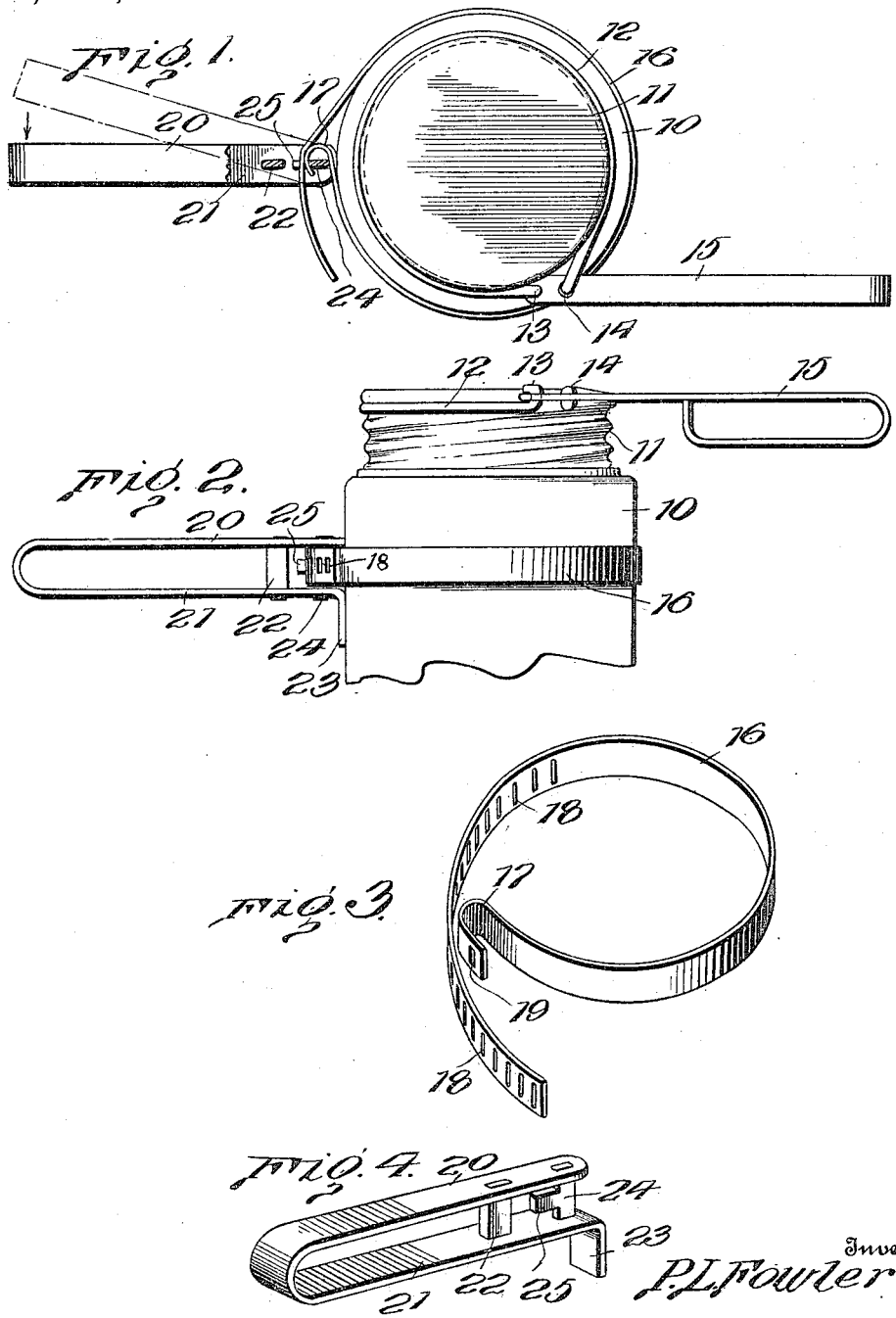

UNITED STATES PATENT OFFICE.

PAUL L. FOWLER, OF OGDEN, UTAH.

JAR-HOLDER AND TOP-REMOVER.

1,211,695.  Specification of Letters Patent.  Patented Jan. 9, 1917.

Application filed July 28, 1915. Serial No. 42,376.

*To all whom it may concern:*

Be it known that I, PAUL L. FOWLER, a citizen of the United States, residing at Ogden, in the county of Weber and State of Utah, have invented certain new and useful Improvements in Jar-Holders and Top-Removers, of which the following as a specification.

This invention relates to devices for applying or releasing the caps or covers of fruit jars, and has for one of its objects to provide a simply constructed device whereby the caps of fruit jars may be applied or removed without danger of breakage and removed from the jar no matter how strongly they may stick upon the jar.

Another object of the invention is to provide a simply constructed device comprising a holder for the jar and a removing device for the cap or cover which coact to produce the required result.

With these and other objects in view, the invention consists in certain novel features of construction as hereinafter shown and described and then specifically pointed out in the claims; and in the drawings illustrative of the preferred embodiment of the invention Figure 1 is a plan view of the conventional fruit jar with the improved implement applied and partly in section. Fig. 2 is a side elevation of the parts shown in Fig. 1. Fig. 3 is a detached perspective view of the holding band of one portion of the improved device. Fig. 4 is a detached perspective view of the operating lever element of one portion of the improved device.

Corresponding and like parts are referred to in the following description and indicated in all the views of the accompanying drawings by the same reference characters.

The improved device comprises an implement for grasping the cover of a fruit jar to apply or remove the same and an implement for holding the fruit jar while the cover is being applied or removed.

The improved device is designed for use upon the class of jars having screw tops and, for the purpose of illustration, a conventional jar of this form is shown, the body of the jar being represented conventionally at 10 and the screw cap at 11. The portion of the improved device which engages the cap comprises a band member 12, preferably of resilient wire and having hooks 13—14 at its terminals. A gripping member 15 forms a part of the improved device and is provided with apertures near one end to receive the hooks 13—14, as illustrated in Fig. 1. The member 12 is of sufficient length so that, when the handle 15 is disposed in one position, the member 12 may be engaged with the cap 11 and then, when the member 15 is moved in the direction of the arrow, the member 12 will be firmly gripped upon the cap so that further movement of the handle 15 will carry the cap with it and thus apply the cap to the jar. When the cap is to be removed, the implement including the handle 15 and the band 12 is reversed in position and the cap removed by moving the lever in the opposite direction, as will be obvious.

The body engaging portion of the improved device comprises a band 16, preferably of flat steel or the like, bent into a hook 17 at one end and provided with a plurality of slots 18 at the other end. The hook portion 17 is likewise provided with a slot 19 similar to the slots 18.

A gripping or strain applying device likewise forms a part of the invention, and is formed as shown in Fig. 4 and including sides 20—21 spaced apart and preferably connected by a stay member 22 which holds the members 20—21 in spaced relation. At its free end, the side 21 is downturned, as represented at 23. Extending between the members 20—21 near their outer ends is another stay member 24 having an offset 25 extending toward the stay 22.

In operating the improved device, the band 16 is disposed around the body 10 and the hooked terminal 17 engaged around the stay 24 with the projection 25 extending through the aperture 19. The free end of the band 16 is then inserted between the sides 20—21 and likewise between the stay 22 and the adjacent terminal of the projection 25, and the band drawn as tightly as possible around the body 10 with the strain applying device, including the sides 20—21, disposed at an angle to the body 10, as shown by dotted lines in Fig. 1, and the nearest aperture 18 disposed over the portion of the extension 25 which projects beyond the hooked portion 17 of the band, as illustrated in Fig. 1. Then by applying force to the straining member in the direction of the arrow, the band 16 will be firmly gripped against the body of the jar and the latter held from movement. When the straining device is applied, the downwardly directed portion 23 will bear against the adjacent face of the jar and thus materially increase the area of the contact of the gripping device with the body of the jar. By this means, the jar may be firmly held from movement while the cover is being applied and, by reversing the position of the band 16 and the straining member and reversing the position of the cover applying portion of the device, the jar may be firmly held while the cover is being applied, as will be obvious. By this simple means, by simply reversing the position of the straining members, the jar may be firmly held while the cover is being either applied or removed.

The improved device is simple in construction and can be instantly applied to either detach or attach the cover.

Having thus described the invention, what is claimed as new is:

1. A device for the purpose set forth comprising a flat band having one end doubled on itself to form a hook and provided at the extremity of said hook portion with a perforation, the band being provided adjacent its opposite terminal with a plurality of transverse openings, and a holding member comprising parallel spaced sides adapted to fit over the ends of the band, spaced stays connecting said sides and an offset on the stay nearer the ends of the said sides projecting toward the other stay, the stay provided with the offset being adapted to fit within the hook on the band and have its offset engaged in the opening therethrough, the other end of the band passing between the stays and having one of its openings engaged over said offset whereby the inner stay will hold the ends of the band together on said offset.

2. A device for the purpose set forth comprising a flat band having one end doubled on itself to form a hook and provided at the extremity of said hook portion with a perforation, the band being provided adjacent its opposite terminal with a plurality of transverse openings, and a holding member comprising parallel spaced sides adapted to fit over the ends of the band, spaced stays connecting said sides and an offset on the stay nearer the ends of the said sides projecting toward the other stay, the stay provided with the offset being adapted to fit within the hook on the band and have its offset engaged in the opening therethrough, the other end of the band passing between the stays and having one of its openings engaged over said offset whereby the inner stay will hold the ends of the band together on said offset, one of the said sides being provided at the end adjacent the stays with a laterally extending fulcrum plate.

In testimony whereof I affix my signature.

PAUL L. FOWLER. [L. S.]

Copies of this patent may be obtained for five cents each, by addressing the "Commissioner of Patents, Washington, D. C."